United States Patent Office 2,757,074
Patented July 31, 1956

2,757,074
REGENERATION OF CAUSTIC ALKALI SOLUTIONS CONTAINING MERCAPTANS

John Raymond Grayson and Charles Emlyn Evans, London, England, assignors to The British Petroleum Company Limited No Drawing. Application February 9, 1952,
Serial No. 270,902

Claims priority, application Great Britain
February 14, 1951

7 Claims. (Cl. 23—184)

This invention relates to the regeneration of caustic alkali solutions which have been used for the removal of mercaptans from sour hydrocarbon oils.

It is known that such mercaptan-containing caustic alkali solutions may be regenerated by blowing with oxygen or an oxygen-containing gas in the presence of an organic catalyst. Polyhydroxy benzene carboxylic acids or tannins have been used commercially as such oxidation catalysts but in this case it is necessary for a small proportion of the mercaptans to be left in the regenerated caustic alkali solution in order to inhibit the oxidation of the oxidation catalyst. In this connection, it has also been proposed to add to the caustic alkali solution an extremely small quantity as low as .0001% of a compound of a metal selected from the group consisting of copper, nickel, cobalt and iron. Such addition is stated to render suitable for use as oxidation catalysts, phenolic compounds which are otherwise ineffective or only slightly effective as such catalysts.

It has now been discovered that the regeneration of mercaptan-containing caustic alkali solutions may be effected without the use of an organic catalyst but in the presence of an inorganic catalyst essentially comprising the copper radicle, which is not itself susceptible to oxidation with the advantage that the regeneration of the caustic alkali solution may be carried as near completion as possible.

According to the invention, the regeneration of a mercaptan-containing caustic alkali solution is effected by treating said solution with oxygen or a gas containing free oxygen in the presence of an inorganic oxidation catalyst which essentially comprises the copper radicle.

The invention is advantageously carried into effect by blowing the mercaptan-containing caustic alkali solution with air in the presence of a copper catalyst in a concentration of between 0.00008% and 0.0008% (wt. cu./vol.). The use of 0.00008% of copper as catalyst more than doubles the regeneration rate of uncatalysed solution while the regeneration rate is increased from between 4 to 5 times by raising the copper concentration from 0.00008% to 0.0008%, but the increase of the copper content beyond 0.0008% does not increase the regeneration rate proportionally.

It has been found that the rate of regeneration falls with increasing concentration of the caustic alkali solution until, in the case of caustic soda, at a concentration of about 15% (15 gm. NaOH/100 ml. solution) there is only a very small increase in the regeneration rate.

It has further been found that a copper catalyst is effective for the regeneration of stronger caustic alkali solutions provided the operation is carried out in the presence of a solutizer or solubility promotor, i. e. a substance which increases the solubility of mercaptans in the alkali solution. For example, the rate of regeneration of a 16% caustic soda solution containing 1.2 N sodium cresylate is considerably increased by a copper concentration of 0.0008 w./v. percent.

The invention will be further described with reference to the following experiments.

Caustic soda/mercaptan solutions were made up by dissolving mercaptans (ethyl 71%, methyl 28%, isopropyl 1%) in 7% NaOH to give mercaptan iodine values of approximately 300. 300 ml. of solution were air blown at a rate of 12 cu. ft./hr. at a temperature of 85–90° F.

In order to determine the effect of copper concentration, a copper sulphate solution was prepared containing 2.4 gm. cu./litre. Varying quantities were added to 300 ml. of 7% soda/mercaptan solution as prepared above and the solutions were air blown as described above. The results are set out in Table I below.

Table I

[300 mls. 7% soda/mercaptan solution. Air rate 12 cu. ft./hr. Temp. 85–90° F.]

| Copper Sulphate soln. A added, mls. | Nil | 25 | 10 | 5 | 1 | 0.25 | 0.1 | Nil |
|---|---|---|---|---|---|---|---|---|
| Copper Concentration (W./V.) Percent | Nil | 0.02 | 0.008 | 0.004 | 0.0008 | 0.0002 | 0.00008 | Nil |
| Mercaptan Iodine Value: | | | | | | | | |
| after 0 minutes | 364 | 302 | 356 | 356 | 366 | 280 | 288 | 288 |
| after 15 minutes | 346 | 204 | 298 | 310 | 326 | 220 | 256 | |
| after 30 minutes | 328 | 138 | 246 | 262 | 280 | 186 | 230 | |
| after 45 minutes | 310 | 46 | 202 | 224 | 236 | 158 | 210 | |
| after 60 minutes | 292 | 10 | 178 | 192 | 192 | 130 | 190 | 234 |
| after 75 minutes | 296 | | 140 | 162 | 164 | 96 | 174 | |
| after 90 minutes | 262 | | 104 | 128 | 120 | 54 | 160 | |
| after 105 minutes | 252 | | 44 | 76 | 70 | 16 | 138 | |
| after 120 minutes | 242 | | 12 | 14 | 14 | | 110 | 196 |
| after 180 minutes | 216 | | | | | | | |
| after 240 minutes | 188 | | | | | | | |
| after 300 minutes | 178 | | | | | | | 168 |
| Average Iodine Value Drop per 15 mins. | 9 | 73 | 43 | 43 | 44 | 38 | 22 | 8 |

The following Tables II and III show the effect of varying the rate of air blowing and the soda concentration respectively, using 300 ml. of solution containing 0.0008 w./v. percent copper.

Table II

[Copper concentration in soda/mercaptan solution=0.0008% (W./V.). Total alkalinity 7.0 gms. NaOH/100 mls. solution. 300 mls. Solution. Temp. 85-90° F.]

| Air Rate, cu.ft./hr | 7 | 12 | 25 |
|---|---|---|---|
| Mercaptan Iodine Value: | | | |
| after 0 minutes | 368 | 366 | 376 |
| after 15 minutes | 320 | 310 | 290 |
| after 30 minutes | 270 | 258 | 220 |
| after 45 minutes | 230 | 202 | 160 |
| after 60 minutes | 176 | 156 | 112 |
| after 75 minutes | 136 | 106 | 48 |
| after 90 minutes | 70 | 42 | 14 |
| after 105 minutes | 20 | 10 | |

Table III

[300 mls. soda/mercaptan solution. Air rate 12 cu. ft./hr. Temp. 85-90° F.]

| Total Alkalinity of Soln. (gms.) NaOH/100 mls. soln | 3.2 | 3.2 | 5.2 | 5.2 | 6.8 | 7.0 | 7.0 | 10.2 | 10.2 | 11.6 | 15 | 15 | 15 | 15 |
|---|---|---|---|---|---|---|---|---|---|---|---|---|---|---|
| Copper Sulphate Soln. A added, mls | Nil | 1.0 | Nil | 1.0 | 1.0 | Nil | 1.0 | Nil | 1.0 | 1.0 | Nil | 1.0 | 5.0 | 25.0 |
| Copper Concentration percent (W./V.) | | 0.0008 | | 0.0008 | 0.0008 | | 0.0008 | | 0.0008 | 0.0008 | | 0.0008 | 0.004 | 0.02 |
| Mercaptan Iodine Value: | | | | | | | | | | | | | | |
| After 0 mins | 340 | 344 | 290 | 286 | 300 | 364 | 366 | 378 | 384 | 336 | 302 | 296 | 300 | 450 |
| After 15 mins | 324 | 260 | 272 | 182 | 238 | 346 | 326 | | 340 | | 296 | 284 | 280 | 420 |
| After 30 mins | 310 | 172 | 256 | 112 | 194 | 328 | 280 | | 312 | 270 | 294 | 274 | 270 | 390 |
| After 45 mins | 298 | 96 | 240 | 36 | 164 | 310 | 236 | | 286 | | 294 | 270 | 258 | 350 |
| After 60 mins | 286 | 42 | 232 | 4 | 136 | 292 | 164 | 336 | 260 | 214 | 292 | 266 | 248 | 330 |
| After 75 mins | 276 | 4 | 222 | | 98 | 276 | 364 | | 238 | | 292 | 266 | 240 | 315 |
| After 90 mins | 264 | | | | 56 | 262 | 120 | | 212 | 154 | 290 | 264 | 234 | 285 |
| After 105 mins | 254 | | | | 12 | 252 | 70 | | 192 | | | | 228 | 250 |
| After 120 mins | 248 | | | | | 242 | 14 | 290 | 162 | 84 | | | 218 | 214 |
| After 135 mins | | | | | | | | | | 36 | | | | 196 |
| After 180 mins | | | | | | 216 | | 260 | 30 | | | | | |
| After 300 mins | | | | | | 178 | | | | | | | | |
| Average Mercaptan removed per 15 mins. (i. e. I₂ Value Drop per 15 minutes) | 12 | 68 | 13 | 71 | 41 | 9 | 44 | 10 | 30 | 32 | 2 | 5 | 10 | 29 |

It will be seen from Table II that the rate of mercaptan removal increases with increasing air rate. A drop in iodine value of 192 took place in 60 minutes at an air rate of 7 cu. ft./hour and a drop of 264 in 60 minutes at 25 cu. ft./hour. It is clear from Table III that the weaker the soda solution, the greater is the rate of mercaptan removal.

In order to demonstrate the effect of copper as a catalyst in the regeneration of solutizer solutions by air blowing, the following experiments were carried out using the same materials and methods as before.

(1) Air blowing of 4N NaOH+mercaptans with and without the addition of 0.0008 w./v. percent copper as copper sulphate.

(2) Air blowing of 4N NaOH+1.2 N sodium cresylate with and without mercaptans and with and without the addition of 0.0008 w./v. percent copper as copper sulphate.

The results are set out in Table IV below.

Table IV

[300 mls. solution. Air rate 12 cu. ft./hr. Temp. 85-90° F.]

| Solution Used | 4 N NaOH | | 4 N NaOH+1.2 N Sodium Cresylate | | | |
|---|---|---|---|---|---|---|
| Copper Concentration, W./V. Percent | Nil | 0.0008 | Nil | 0.0008 | Nil | 0.0008 |
| Iodine Value of Soda Soln. without Mercaptans (Blank) | Nil | Nil | 440 | 446 | 430 | 428 |
| Mercaptans | Added | Added | Added | Added | Nil | Nil |
| Total Iodine Value: | | | | Mercaptan I. V. | | Mercaptan I. V. |
| after 0 minutes | 396 | 450 | 794 | 354 | 826 | 380 | 430 | 428 |
| after 30 minutes | | 430 | 736 | 296 | 734 | 288 | | |
| after 60 minutes | 340 | 418 | 684 | 244 | 620 | 174 | 424 | 424 |
| after 90 minutes | 330 | 390 | 628 | 188 | 544 | 98 | | |
| after 120 minutes | 316 | 352 | 592 | 152 | 480 | 34 | 430 | 420 |
| after 150 minutes | | 326 | 546 | 106 | 480 | 34 | | |
| after 180 minutes | 288 | 300 | 502 | 62 | 460 | 14 | 430 | 420 |
| after 210 minutes | | | 470 | 30 | | | | |

It will be seen that the regeneration rate of 4N (16%) soda/mercaptan solution was increased but slightly by the addition of copper catalyst, while the rate of regeneration, solutizer solution increased by the addition of copper.

We claim:

1. A process for the regeneration of a mercaptan-containing caustic alkali solution derived from a mercaptan-containing oil by extracting the oil with a caustic alkali solution to cause the mercaptan to pass thereinto and then separating said mercaptan-containing caustic alkali solution from the oil for regeneration which process consists essentially of treating the mercaptan-containing caustic alkali solution with free oxygen in the presence solely of an inorganic catalyst consisting essentially of between about 0.00008% and 0.0008% of copper sulphate measured as weight of copper per volume.

2. A process in accordance with claim 1 wherein a mercaptan-containing caustic alkali solution after separation containing more than the equivalent of about 15 grams NaOH/100 ml. solution, and which includes a compound which increases the solubility of mercaptans in the caustic alkali solution.

3. A process in accordance with claim 1 wherein the mercaptan-containing solution is treated with the free oxygen at a temperature of about 85° to 90° F.

4. A process in accordance with claim 1 wherein a mercaptan-containing caustic alkali solution after separation from the oil does not contain more than the equivalent of about 15 grams NaOH/100 ml. solution.

5. A process in accordance with claim 4 wherein the compound added to increase the solubility mercaptans in the caustic alkali solution is sodium cresylate.

6. A process for the regeneration of a mercaptan-containing caustic alkali solution derived from a mercaptan-containing oil by extracting the oil with a caustic alkali solution to cause the mercaptan to pass thereinto and then separating said mercaptan-containing caustic alkali solution from the oil for regeneration which process consists essentially of treating the mercaptan-containing caustic alkali solution with gas containing free oxygen in the presence solely of an inorganic catalyst consisting essentially of between about 0.00008% and 0.0008% of copper sulphate measured as weight of copper per volume.

7. A process for the regeneration of a mercaptan-containing caustic alkali solution derived from a mercaptan-containing oil by extracting the oil with a caustic alkali solution to cause the mercaptan to pass thereinto and then separating said mercaptan-containing caustic alkali solution from the oil for regeneration which process consists essentially of treating the mercaptan-containing caustic alkali solution with air in the presence solely of an inorganic catalyst consisting essentially of between about 0.00008% and 0.0008% of copper sulphate measured as weight of copper per volume.

References Cited in the file of this patent

UNITED STATES PATENTS

| | | |
|---|---|---|
| 2,152,724 | Yarbroff | Apr. 4, 1939 |
| 2,297,751 | Dryer | Oct. 6, 1942 |
| 2,413,945 | Bolt | Jan. 7, 1947 |
| 2,425,414 | Bond | Aug. 12, 1947 |
| 2,431,770 | Payne et al. | Dec. 2, 1947 |
| 2,457,635 | Bond et al. | Dec. 28, 1948 |
| 2,503,627 | McBride et al. | Apr. 11, 1950 |
| 2,516,837 | Happel | Aug. 1, 1950 |
| 2,552,399 | Browder | Apr. 11, 1950 |
| 2,591,946 | Krause et al. | Apr. 8, 1952 |